(12) United States Patent
Archer et al.

(10) Patent No.: US 8,108,467 B2
(45) Date of Patent: Jan. 31, 2012

(54) LOAD BALANCED DATA PROCESSING PERFORMED ON AN APPLICATION MESSAGE TRANSMITTED BETWEEN COMPUTE NODES OF A PARALLEL COMPUTER

(75) Inventors: Charles J. Archer, Rochester, MN (US); Michael A. Blocksome, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 632 days.

(21) Appl. No.: 12/147,073

(22) Filed: Jun. 26, 2008

(65) Prior Publication Data

US 2009/0327464 A1    Dec. 31, 2009

(51) Int. Cl.
G06F 15/16 (2006.01)
G06F 15/167 (2006.01)

(52) U.S. Cl. .................. 709/205; 709/201; 709/213

(58) Field of Classification Search .......... 709/204–207, 709/201, 213–216; 718/104–107
See application file for complete search history.

(56) References Cited

U.S. PATENT DOCUMENTS

| | | | | |
|---|---|---|---|---|
| 5,408,646 A * | 4/1995 | Olnowich et al. | .................. | 714/4 |
| 7,219,122 B1 * | 5/2007 | Pena-Mora et al. | .......... | 709/201 |
| 7,684,876 B2 * | 3/2010 | Grgic | .............................. | 700/19 |
| 2002/0107903 A1 * | 8/2002 | Richter et al. | ................. | 709/201 |
| 2002/0107962 A1 * | 8/2002 | Richter et al. | ................. | 709/225 |
| 2002/0107971 A1 * | 8/2002 | Bailey et al. | .................. | 709/231 |
| 2004/0078493 A1 * | 4/2004 | Blumrich et al. | ............. | 709/250 |
| 2005/0021594 A1 * | 1/2005 | Bernardin et al. | ............ | 709/200 |
| 2006/0184626 A1 * | 8/2006 | Agapi et al. | .................. | 709/205 |
| 2007/0124363 A1 * | 5/2007 | Lurie et al. | .................... | 709/202 |
| 2009/0158276 A1 * | 6/2009 | Barsness et al. | ............. | 718/100 |

OTHER PUBLICATIONS

Final Office Action, U.S. Appl. No. 11/553,101, mailing date Mar. 31, 2010.

* cited by examiner

*Primary Examiner* — Brendan Higa
(74) *Attorney, Agent, or Firm* — Biggers & Ohanian LLP

(57) ABSTRACT

Methods, apparatus, and products are disclosed for load balanced data processing performed on an application message transmitted between compute nodes of a parallel computer that include: identifying, by an origin compute node, an application message for transmission to a target compute node, the message to be processed by a data processing operation; determining, by the origin compute node, origin sub-operations used to carry out a portion of the data processing operation on the origin compute node; determining, by the origin compute node, target sub-operations used to carry out a remaining portion of the data processing operation on the target compute node; processing, by the origin compute node, the message using the origin sub-operations; and transmitting, by the origin compute node, the processed message to the target compute node for processing using the target sub-operations.

15 Claims, 8 Drawing Sheets

LOAD BALANCED DATA PROCESSING PERFORMED ON AN APPLICATION MESSAGE TRANSMITTED BETWEEN COMPUTE NODES OF A PARALLEL COMPUTER

BACKGROUND OF THE INVENTION

1. Field of the Invention

The field of the invention is data processing, or, more specifically, methods, apparatus, and products for load balanced data processing performed on an application message transmitted between compute nodes of a parallel computer.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Parallel computing is an area of computer technology that has experienced advances. Parallel computing is the simultaneous execution of the same task (split up and specially adapted) on multiple processors in order to obtain results faster. Parallel computing is based on the fact that the process of solving a problem usually can be divided into smaller tasks, which may be carried out simultaneously with some coordination.

Parallel computers execute parallel algorithms. A parallel algorithm can be split up to be executed a piece at a time on many different processing devices, and then put back together again at the end to get a data processing result. Some algorithms are easy to divide up into pieces. Splitting up the job of checking all of the numbers from one to a hundred thousand to see which are primes could be done, for example, by assigning a subset of the numbers to each available processor, and then putting the list of positive results back together. In this specification, the multiple processing devices that execute the individual pieces of a parallel program are referred to as 'compute nodes.' A parallel computer is composed of compute nodes and other processing nodes as well, including, for example, input/output ('I/O') nodes, and service nodes.

Parallel algorithms are valuable because it is faster to perform some kinds of large computing tasks via a parallel algorithm than it is via a serial (non-parallel) algorithm, because of the way modern processors work. It is far more difficult to construct a computer with a single fast processor than one with many slow processors with the same throughput. There are also certain theoretical limits to the potential speed of serial processors. On the other hand, every parallel algorithm has a serial part and so parallel algorithms have a saturation point. After that point adding more processors does not yield any more throughput but only increases the overhead and cost.

Parallel algorithms are designed also to optimize one more resource the data communications requirements among the nodes of a parallel computer. There are two ways parallel processors communicate, shared memory or message passing. Shared memory processing needs additional locking for the data and imposes the overhead of additional processor and bus cycles and also serializes some portion of the algorithm.

Message passing processing uses high-speed data communications networks and message buffers, but this communication adds transfer overhead on the data communications networks as well as additional memory need for message buffers and latency in the data communications among nodes. Designs of parallel computers use specially designed data communications links so that the communication overhead will be small but it is the parallel algorithm that decides the volume of the traffic.

Many data communications network architectures are used for message passing among nodes in parallel computers. Compute nodes may be organized in a network as a 'torus' or 'mesh,' for example. Also, compute nodes may be organized in a network as a tree. A torus network connects the nodes in a three-dimensional mesh with wrap around links. Every node is connected to its six neighbors through this torus network, and each node is addressed by its x,y,z coordinate in the mesh. In such a manner, a torus network lends itself to point to point operations. In a tree network, the nodes typically are organized in a binary tree arrangement: each node has a parent and two children (although some nodes may only have zero children or one child, depending on the hardware configuration). In computers that use a torus and a tree network, the two networks typically are implemented independently of one another, with separate routing circuits, separate physical links, and separate message buffers. A tree network provides high bandwidth and low latency for certain collective operations, such as, for example, an allgather, allreduce, broadcast, scatter, and so on.

A common data processing operation in parallel computing is an accumulate operation. In an accumulate operation, data on a source compute node is scaled and combined with data on a destination compute node, and the results are stored on the destination node. Such an accumulate operations is generally carried out by the destination node after receiving the initial data from the source node. The drawback to the current method of performing an accumulate operation is that, after sending the data to the destination node, the source node no longer participate in the data processing operations used to carry out the accumulate operation, thereby resulting in the destination node having to bear most of the processing load. This unbalanced processing is undesirable because the source node's computing resources are not effectively utilized, which wastes these valuable computing resources.

SUMMARY OF THE INVENTION

Methods, apparatus, and products are disclosed for load balanced data processing performed on an application message transmitted between compute nodes of a parallel computer that include: identifying, by an origin compute node, an application message for transmission to a target compute node, the message to be processed by a data processing operation; determining, by the origin compute node, origin sub-operations used to carry out a portion of the data processing operation on the origin compute node; determining, by the origin compute node, target sub-operations used to carry out a remaining portion of the data processing operation on the target compute node; processing, by the origin compute node, the message using the origin sub-operations; and transmitting, by the origin compute node, the processed message to the target compute node for processing using the target sub-operations.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
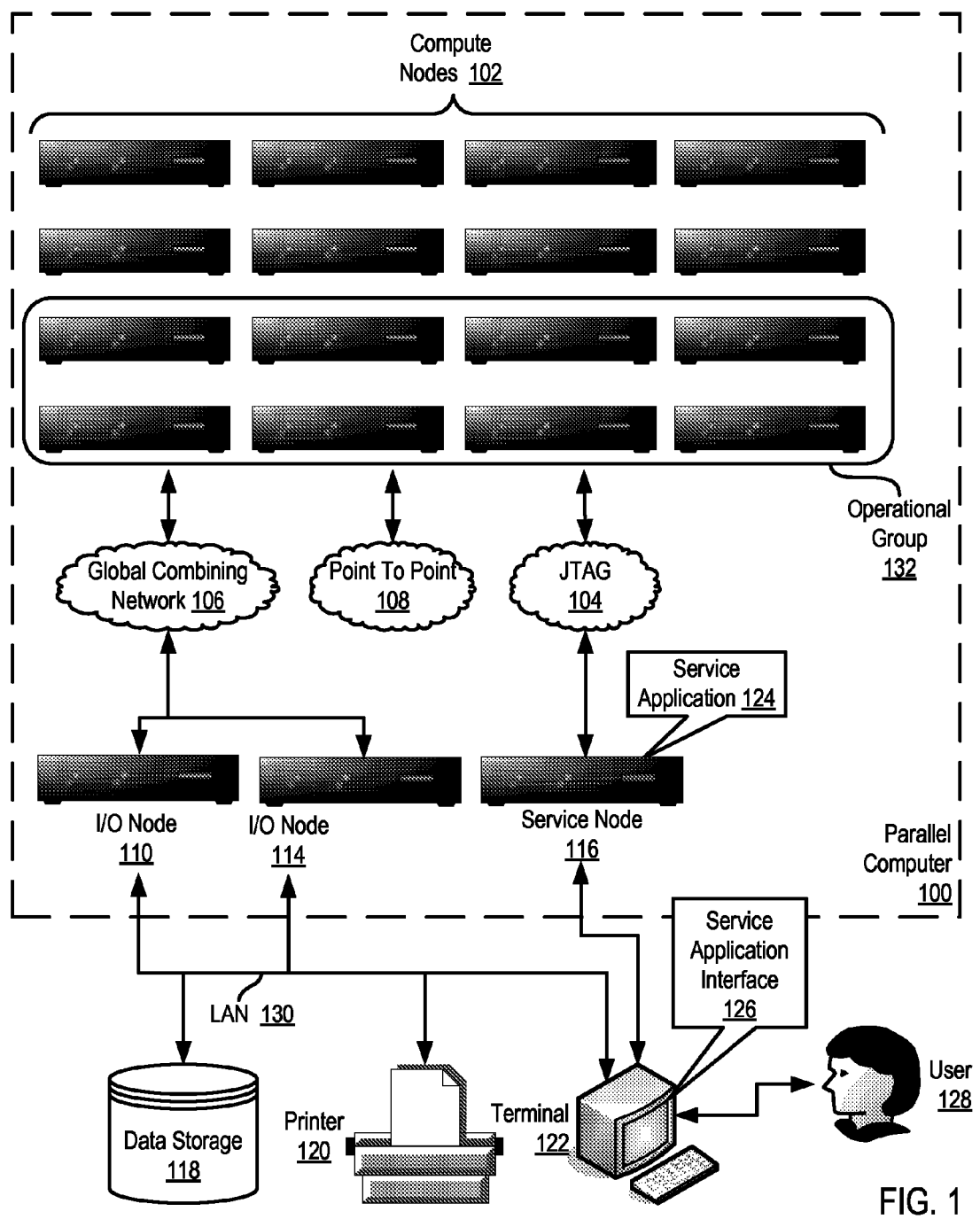
FIG. 1 illustrates an exemplary system for load balanced data processing performed on an application message transmitted between compute nodes of a parallel computer according to embodiments of the present invention.

Exemplary methods, apparatus, and computer program products for load balanced data processing performed on an application message transmitted between compute nodes of a parallel computer according to embodiments of the present invention are described with reference to the accompanying drawings, beginning with FIG. 1. FIG. 1 illustrates an exemplary system for load balanced data processing performed on an application message transmitted between compute nodes of a parallel computer according to embodiments of the present invention. The system of FIG. 1 includes a parallel computer (100), non-volatile memory for the computer in the form of data storage device (118), an output device for the computer in the form of printer (120), and an input/output device for the computer in the form of computer terminal (122). Parallel computer (100) in the example of FIG. 1 includes a plurality of compute nodes (102) that execute an application. The application is a set of computer program instructions that provide user-level data processing.

Each compute node (102) of FIG. 1 may include a plurality of processors for use in executing an application on the parallel computer (100) according to embodiments of the present invention. The processors of each compute node (102) in FIG. 1 are operatively coupled to computer memory such as, for example, random access memory ('RAM'). Each compute node (102) may operate in several distinct modes that affect the relationship among the processors and the memory on that node such as, for example, serial processing mode or parallel processing mode. The mode in which the compute nodes operate is generally set during the node's boot processes and does not change until the node reboots.

In serial processing mode, often referred to a 'virtual node mode,' the processors of a compute node operate independently of one another, and each processor has access to a partition of the node's total memory that is exclusively dedicated to that processor. For example, if a compute node has four processors and two Gigabytes (GB) of RAM, when operating in serial processing mode, each processor may process a thread independently of the other processors on that node, and each processor may access a 512 Megabyte (MB) portion of that node's total 2 GB of RAM.

In parallel processing mode, often referred to as 'symmetric multi-processing mode,' one of the processors acts as a master, and the remaining processors serve as slaves to the master processor. Each processor has access to the full range of computer memory on the compute node. Continuing with the exemplary node above having four processors and 2 GB of RAM, for example, each slave processor may cooperatively process threads spawned from the master processor, and all of the processors have access to the node's entire 2 GB of RAM.

The compute nodes (102) are coupled for data communications by several independent data communications networks including a Joint Test Action Group ('JTAG') network (104), a global combining network (106) which is optimized for collective operations, and a torus network (108) which is optimized point to point operations. The global combining network (106) is a data communications network that includes data communications links connected to the compute nodes so as to organize the compute nodes as a tree. Each data communications network is implemented with data communications links among the compute nodes (102). The data communications links provide data communications for parallel operations among the compute nodes of the parallel computer. The links between compute nodes are bi-directional links that are typically implemented using two separate directional data communications paths.

In addition, the compute nodes (102) of parallel computer are organized into at least one operational group (132) of compute nodes for collective parallel operations on parallel computer (100). An operational group of compute nodes is the set of compute nodes upon which a collective parallel operation executes. Collective operations are implemented with data communications among the compute nodes of an operational group. Collective operations are those functions that involve all the compute nodes of an operational group. A collective operation is an operation, a message-passing computer program instruction that is executed simultaneously, that is, at approximately the same time, by all the compute nodes in an operational group of compute nodes. Such an operational group may include all the compute nodes in a parallel computer (100) or a subset all the compute nodes. Collective operations are often built around point to point operations. A collective operation requires that all processes on all compute nodes within an operational group call the same collective operation with matching arguments. A 'broadcast' is an example of a collective operation for moving data among compute nodes of an operational group. A 'reduce' operation is an example of a collective operation that executes arithmetic or logical functions on data distributed among the compute nodes of an operational group. An operational group may be implemented as, for example, an MPI 'communicator.'

'MPI' refers to 'Message Passing Interface,' a prior art parallel communications library, a module of computer program instructions for data communications on parallel computers. Examples of prior-art parallel communications libraries that may be improved for use with systems according to embodiments of the present invention include MPI and the 'Parallel Virtual Machine' ('PVM') library. PVM was developed by the University of Tennessee, The Oak Ridge National Laboratory, and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Some collective operations have a single originating or receiving process running on a particular compute node in an operational group. For example, in a 'broadcast' collective operation, the process on the compute node that distributes the data to all the other compute nodes is an originating process. In a 'gather' operation, for example, the process on the compute node that received all the data from the other compute nodes is a receiving process. The compute node on which such an originating or receiving process runs is referred to as a logical root.

Most collective operations are variations or combinations of four basic operations: broadcast, gather, scatter, and reduce. The interfaces for these collective operations are defined in the MPI standards promulgated by the MPI Forum. Algorithms for executing collective operations, however, are not defined in the MPI standards. In a broadcast operation, all processes specify the same root process, whose buffer contents will be sent. Processes other than the root specify receive buffers. After the operation, all buffers contain the message from the root process.

In a scatter operation, the logical root divides data on the root into segments and distributes a different segment to each compute node in the operational group. In scatter operation, all processes typically specify the same receive count. The send arguments are only significant to the root process, whose buffer actually contains sendcount*N elements of a given data type, where N is the number of processes in the given group of compute nodes. The send buffer is divided and dispersed to all processes (including the process on the logical root). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduce operation is also a many-to-one collective operation that includes an arithmetic or logical function performed on two data elements. All processes specify the same 'count' and the same arithmetic or logical function. After the reduction, all processes have sent count data elements from computer node send buffers to the root process. In a reduction operation, data elements from corresponding send buffer locations are combined pair-wise by arithmetic or logical operations to yield a single corresponding element in the root process's receive buffer. Application specific reduction operations can be defined at runtime. Parallel communications libraries may support predefined operations. MPI, for example, provides the following pre-defined reduction operations:

| MPI_MAX | maximum |
| MPI_MIN | minimum |
| MPI_SUM | sum |
| MPI_PROD | product |
| MPI_LAND | logical and |
| MPI_BAND | bitwise and |
| MPI_LOR | logical or |
| MPI_BOR | bitwise or |
| MPI_LXOR | logical exclusive or |
| MPI_BXOR | bitwise exclusive or |

In addition to compute nodes, the parallel computer (100) includes input/output ('I/O') nodes (110, 114) coupled to compute nodes (102) through the global combining network (106). The compute nodes in the parallel computer (100) are partitioned into processing sets such that each compute node in a processing set is connected for data communications to the same I/O node. Each processing set, therefore, is composed of one I/O node and a subset of compute nodes (102). The ratio between the number of compute nodes to the number of I/O nodes in the entire system typically depends on the hardware configuration for the parallel computer. For example, in some configurations, each processing set may be composed of eight compute nodes and one I/O node. In some other configurations, each processing set may be composed of sixty-four compute nodes and one I/O node. Such example are for explanation only, however, and not for limitation. Each I/O nodes provide I/O services between compute nodes (102) of its processing set and a set of I/O devices. In the example of FIG. 1, the I/O nodes (110, 114) are connected for data communications I/O devices (118, 120, 122) through local area network ('LAN') (130) implemented using high-speed Ethernet.

The parallel computer (100) of FIG. 1 also includes a service node (116) coupled to the compute nodes through one of the networks (104). Service node (116) provides services common to pluralities of compute nodes, administering the configuration of compute nodes, loading programs into the compute nodes, starting program execution on the compute nodes, retrieving results of program operations on the computer nodes, and so on. Service node (116) runs a service application (124) and communicates with users (128) through a service application interface (126) that runs on computer terminal (122).

As described in more detail below in this specification, the system of FIG. 1 operates generally for load balanced data processing performed on an application message transmitted between compute nodes of a parallel computer according to embodiments of the present invention. The system of FIG. 1 operates generally for load balanced data processing performed on an application message transmitted between compute nodes of a parallel computer according to embodiments of the present invention as follows: An origin compute node identifies an application message for transmission to a target compute node. The message is to be processed by a data processing operation. The origin compute node determines origin sub-operations used to carry out a portion of the data processing operation on the origin compute node. The origin compute node also determines target sub-operations used to carry out a remaining portion of the data processing operation on a target compute node. The origin compute node then processes the message using the origin sub-operations and transmits the processed message to the target compute node for processing using the target sub-operations. Readers will note that the origin compute node is a compute node attempting to transmit a message, while the target compute node is a compute node intended as the recipient of the message.

A data processing operation is an operation specified by an application that performs a particular data transformation task. The data processing operation is typically one of many data processing operations specified by a parallel application. An example of a data processing operation may include an accumulate operation. In an accumulate operation, message data is scaled and added with other message data to yield an accumulation result. Data processing operations such as, for example, the accumulate operation, may be broken down into sub-operations. These sub-operations are discrete primitive operations used to carry out the individual processing sub-tasks that make up a data processing operation. Consider the accumulate data processing operation for example. The accumulate operation may be broken down in a multiplication sub-operation and an addition sub-operation. Together, the multiplication sub-operation and the addition sub-operation carry out an accumulate operation, but the two sub-operations are in fact distinct primitive operations. Throughout this specification, readers will note that origin sub-operations are performed on the origin compute node, while target sub-operations are performed on the target compute node.

In the example of FIG. 1, the plurality of compute nodes (102) are implemented in a parallel computer (100) and are connected together using a plurality of data communications networks (104, 106, 108). The point to point network (108) is optimized for point to point operations. The global combining network (106) is optimized for collective operations.

The arrangement of nodes, networks, and I/O devices making up the exemplary system illustrated in FIG. 1 are for explanation only, not for limitation of the present invention. Data processing systems capable of load balanced data processing performed on an application message transmitted between compute nodes of a parallel computer according to embodiments of the present invention may include additional nodes, networks, devices, and architectures, not shown in FIG. 1, as will occur to those of skill in the art. Although the parallel computer (100) in the example of FIG. 1 includes sixteen compute nodes (102), readers will note that parallel computers capable of load balanced data processing performed on an application message transmitted between compute nodes of a parallel computer according to embodiments of the present invention may include any number of compute nodes. In addition to Ethernet and JTAG, networks in such data processing systems may support many data communications protocols including for example TCP (Transmission Control Protocol), IP (Internet Protocol), and others as will occur to those of skill in the art. Various embodiments of the present invention may be implemented on a variety of hardware platforms in addition to those illustrated in FIG. 1.

Load balanced data processing performed on an application message transmitted between compute nodes of a parallel computer according to embodiments of the present invention may be generally implemented using a plurality of compute nodes. In fact, such parallel computers may include thousands of such compute nodes. Each compute node is in turn itself a kind of computer composed of one or more computer processors, its own computer memory, and its own input/output adapters. For further explanation, therefore, FIG. 2 sets forth a block diagram of an exemplary compute node useful in a parallel computer capable of load balanced data processing performed on an application message transmitted between compute nodes of the parallel computer according to embodiments of the present invention. The compute node (152) of FIG. 2 includes one or more computer processors (164) as well as random access memory ('RAM') (156). The processors (164) are connected to RAM (156) through a high-speed memory bus (154) and through a bus adapter (194) and an extension bus (168) to other components of the compute node (152). Stored in RAM (156) is an application program (158), a module of computer program instructions that carries out parallel, user-level data processing using parallel algorithms. The application (158) of FIG. 2 allocates an application buffer for storing a message (601) for transmission to another compute node, that is a target compute node.

Also stored in RAM (156) is a messaging module (160), a library of computer program instructions that carry out parallel communications among compute nodes, including point to point operations as well as collective operations. Application program (158) executes collective operations by calling software routines in the messaging module (160). A library of parallel communications routines may be developed from scratch for use in systems according to embodiments of the present invention, using a traditional programming language such as the C programming language, and using traditional programming methods to write parallel communications routines that send and receive data among nodes on two independent data communications networks. Alternatively, existing prior art libraries may be improved to operate according to embodiments of the present invention. Examples of prior-art parallel communications libraries include the 'Message Passing Interface' ('MPI') library and the 'Parallel Virtual Machine' ('PVM') library.

Figure 2:
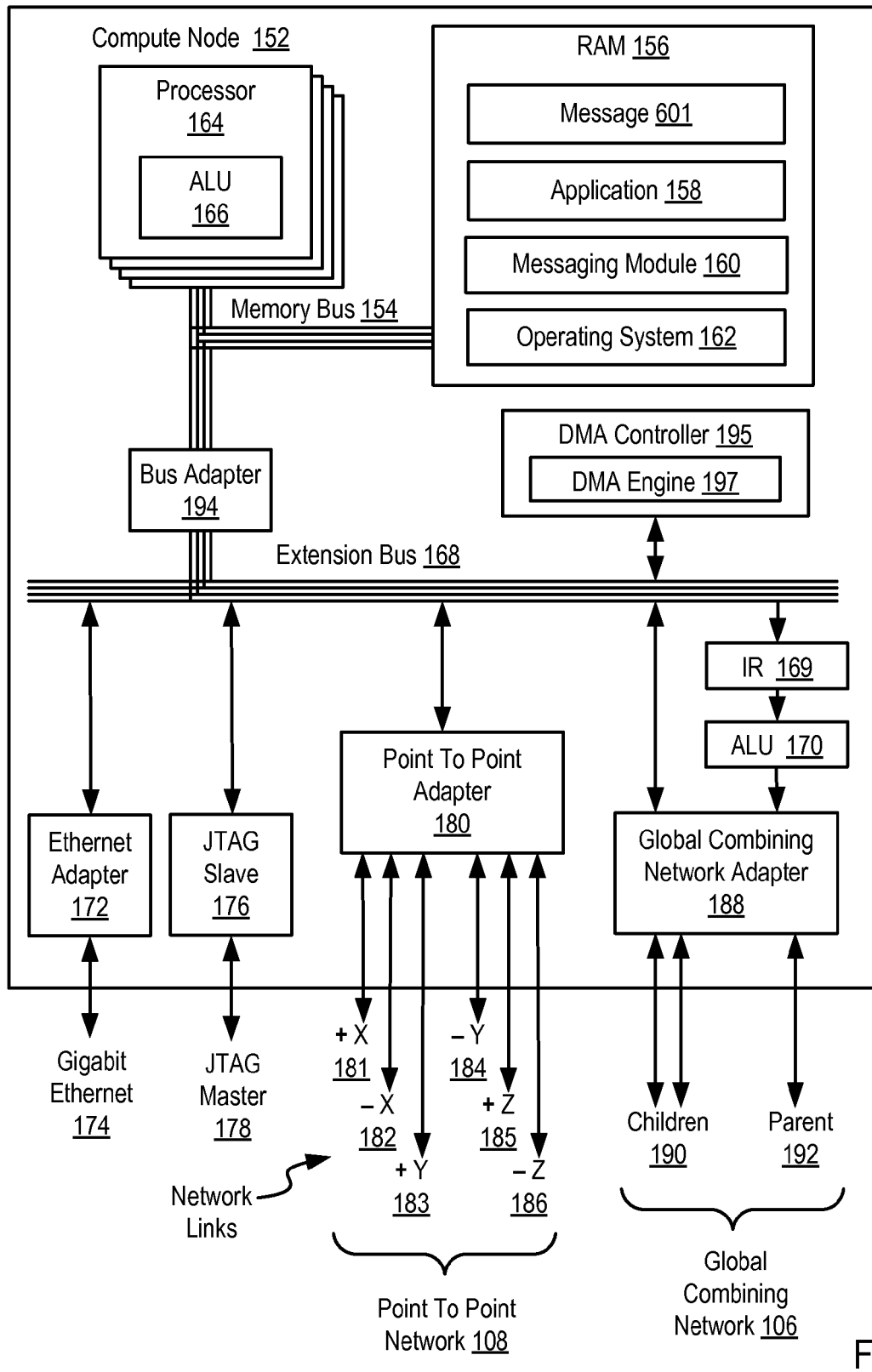
FIG. 2 sets forth a block diagram of an exemplary compute node useful in a parallel computer capable of load balanced data processing performed on an application message transmitted between compute nodes of the parallel computer according to embodiments of the present invention.

The messaging module (160) of FIG. 2 is improved for load balanced data processing performed on an application message transmitted between compute nodes of a parallel computer according to embodiments of the present invention. The messaging module (160) of FIG. 2 operates generally for load balanced data processing performed on an application message transmitted between compute nodes of a parallel computer according to embodiments of the present invention by: identifying an application message (601) for transmission to a target compute node, the message (604) to be processed by a data processing operation; determining origin sub-operations used to carry out a portion of the data processing operation on the origin compute node; determining target sub-operations used to carry out a remaining portion of the data processing operation on the target compute node; processing the message (601) using the origin sub-operations; and transmitting the processed message to the target compute node for processing using the target sub-operations.

Also stored in RAM (156) is an operating system (162), a module of computer program instructions and routines for an application program's access to other resources of the compute node. It is typical for an application program and parallel communications library in a compute node of a parallel computer to run a single thread of execution with no user login and no security issues because the thread is entitled to complete access to all resources of the node. The quantity and complexity of tasks to be performed by an operating system on a compute node in a parallel computer therefore are smaller and less complex than those of an operating system on a serial computer with many threads running simultaneously. In addition, there is no video I/O on the compute node (152) of FIG. 2, another factor that decreases the demands on the operating system. The operating system may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Microsoft XP™, AIX™, IBM's i5/OS™, and others as will occur to those of skill in the art.

The exemplary compute node (152) of FIG. 2 includes several communications adapters (172, 176, 180, 188) for implementing data communications with other nodes of a parallel computer. Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful in systems for load balanced data processing performed on an application message transmitted between compute nodes of a parallel computer according to embodiments of the present invention include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (152) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 includes a JTAG Slave circuit (176) that couples example compute node (152) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient "back door" into the system. The example compute node of FIG. 2 may be all three of these: It typically includes one or more integrated circuits installed on a printed circuit board and may be implemented as an embedded system having its own processor, its own memory, and its own I/O capability. JTAG boundary scans through JTAG Slave (176) may efficiently configure processor registers and memory in compute node (152) for use in load balanced data processing performed on an application message transmitted between compute nodes of a parallel computer according to embodiments of the present invention.

The data communications adapters in the example of FIG. 2 includes a Point To Point Adapter (180) that couples example compute node (152) for data communications to a network (108) that is optimal for point to point message passing operations such as, for example, a network configured as a three-dimensional torus or mesh. Point To Point Adapter (180) provides data communications in six directions on three communications axes, x, y, and z, through six bidirectional links: +x (181), −x (182), +y (183), −y (184), +z (185), and −z (186).

The data communications adapters in the example of FIG. 2 includes a Global Combining Network Adapter (188) that couples example compute node (152) for data communications to a network (106) that is optimal for collective message passing operations on a global combining network configured, for example, as a binary tree. The Global Combining Network Adapter (188) provides data communications through three bidirectional links: two to children nodes (190) and one to a parent node (192).

Example compute node (152) includes two arithmetic logic units ('ALUs'). ALU (166) is a component of processor (164), and a separate ALU (170) is dedicated to the exclusive use of Global Combining Network Adapter (188) for use in performing the arithmetic and logical functions of reduction operations. Computer program instructions of a reduction routine in parallel communications library (160) may latch an instruction for an arithmetic or logical function into instruction register (169). When the arithmetic or logical function of a reduction operation is a 'sum' or a 'logical or,' for example, Global Combining Network Adapter (188) may execute the arithmetic or logical operation by use of ALU (166) in processor (164) or, typically much faster, by use dedicated ALU (170).

The example compute node (152) of FIG. 2 includes a direct memory access ('DMA') controller (195), which is computer hardware for direct memory access and a DMA engine (195), which is computer software for direct memory access. Direct memory access includes reading and writing to memory of compute nodes with reduced operational burden on the central processing units (164). A DMA transfer essentially copies a block of memory from one location to another, typically from one compute node to another. While the CPU may initiate the DMA transfer, the CPU does not execute the transfer.

Figure 3A:
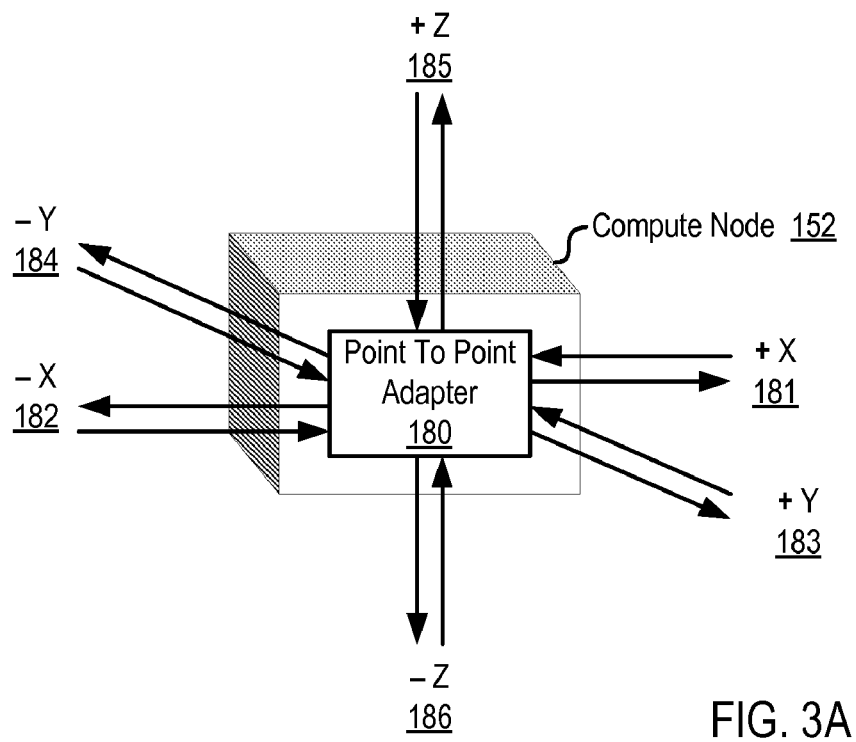
FIG. 3A illustrates an exemplary Point To Point Adapter useful in systems capable of load balanced data processing performed on an application message transmitted between compute nodes of a parallel computer according to embodiments of the present invention.

For further explanation, FIG. 3A illustrates an exemplary Point To Point Adapter (180) useful in systems capable of load balanced data processing performed on an application message transmitted between compute nodes of a parallel computer according to embodiments of the present invention. Point To Point Adapter (180) is designed for use in a data communications network optimized for point to point operations, a network that organizes compute nodes in a three-dimensional torus or mesh. Point To Point Adapter (180) in the example of FIG. 3A provides data communication along an x-axis through four unidirectional data communications links, to and from the next node in the −x direction (182) and to and from the next node in the +x direction (181). Point To Point Adapter (180) also provides data communication along a y-axis through four unidirectional data communications links, to and from the next node in the −y direction (184) and to and from the next node in the +y direction (183). Point To Point Adapter (180) in FIG. 3A also provides data communication along a z-axis through four unidirectional data communications links, to and from the next node in the −z direction (186) and to and from the next node in the +z direction (185).

Figure 3B:
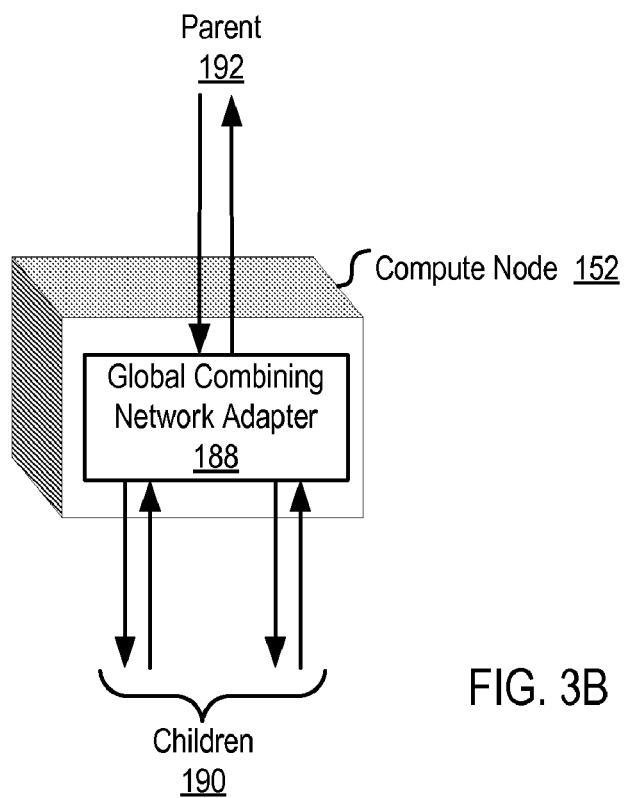
FIG. 3B illustrates an exemplary Global Combining Network Adapter useful in systems capable of load balanced data processing performed on an application message transmitted between compute nodes of a parallel computer according to embodiments of the present invention.

For further explanation, FIG. 3B illustrates an exemplary Global Combining Network Adapter (188) useful in systems capable of load balanced data processing performed on an application message transmitted between compute nodes of a parallel computer according to embodiments of the present invention. Global Combining Network Adapter (188) is designed for use in a network optimized for collective operations, a network that organizes compute nodes of a parallel computer in a binary tree. Global Combining Network Adapter (188) in the example of FIG. 3B provides data communication to and from two children nodes through four unidirectional data communications links (190). Global Combining Network Adapter (188) also provides data communication to and from a parent node through two unidirectional data communications links (192).

Figure 4:
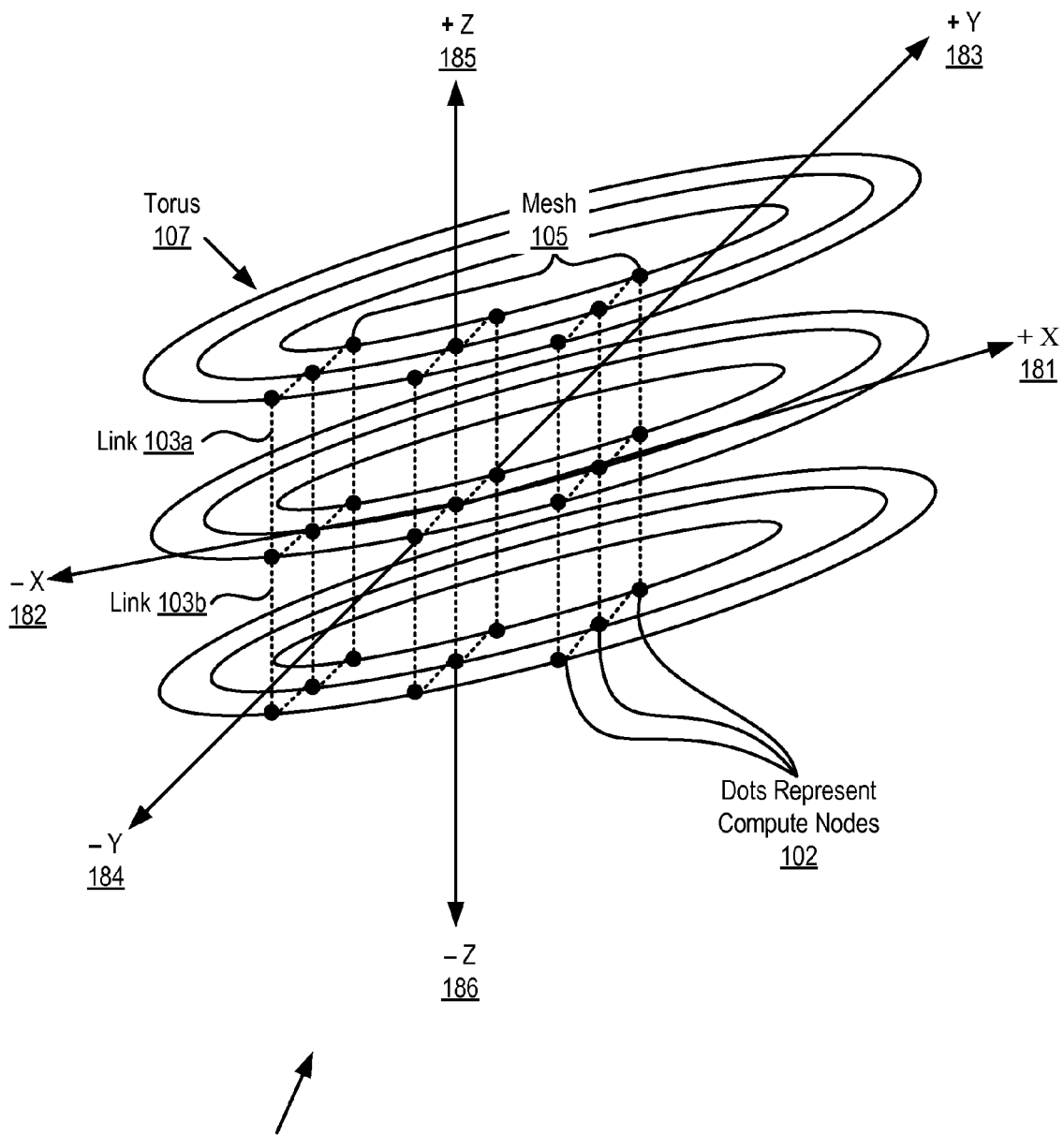
FIG. 4 sets forth a line drawing illustrating an exemplary data communications network optimized for point to point operations useful in systems capable of load balanced data processing performed on an application message transmitted between compute nodes of a parallel computer in accordance with embodiments of the present invention.

For further explanation, FIG. 4 sets forth a line drawing illustrating an exemplary data communications network (108) optimized for point to point operations useful in systems capable of load balanced data processing performed on an application message transmitted between compute nodes of a parallel computer in accordance with embodiments of the present invention. In the example of FIG. 4, dots represent compute nodes (102) of a parallel computer, and the dotted lines between the dots represent data network links (103) between compute nodes. The networks links are implemented with point to point data communications adapters similar to the one illustrated for example in FIG. 3A, with data communications links on three axes, x, y, and z, and to and from in six directions +x (181), −x (182), +y (183), −y (184), +z (185), and −z (186). The links and compute nodes are organized by this data communications network optimized for point to point operations into a three dimensional mesh (105). The mesh (105) has wrap-around links on each axis that connect the outermost compute nodes in the mesh (105) on opposite sides of the mesh (105). These wrap-around links form part of a torus (107). Each compute node in the torus has a location in the torus that is uniquely specified by a set of x, y, z coordinates. Readers will note that the wrap-around links in the y and z directions have been omitted for clarity, but are configured in a similar manner to the wrap-around link illustrated in the x direction. For clarity of explanation, the data communications network of FIG. 4 is illustrated with only 27 compute nodes, but readers will recognize that a data communications network optimized for point to point operations for use in load balanced data processing performed on an application message transmitted between compute nodes of a parallel computer in accordance with embodiments of the present invention may contain only a few compute nodes or may contain thousands of compute nodes.

Figure 5:
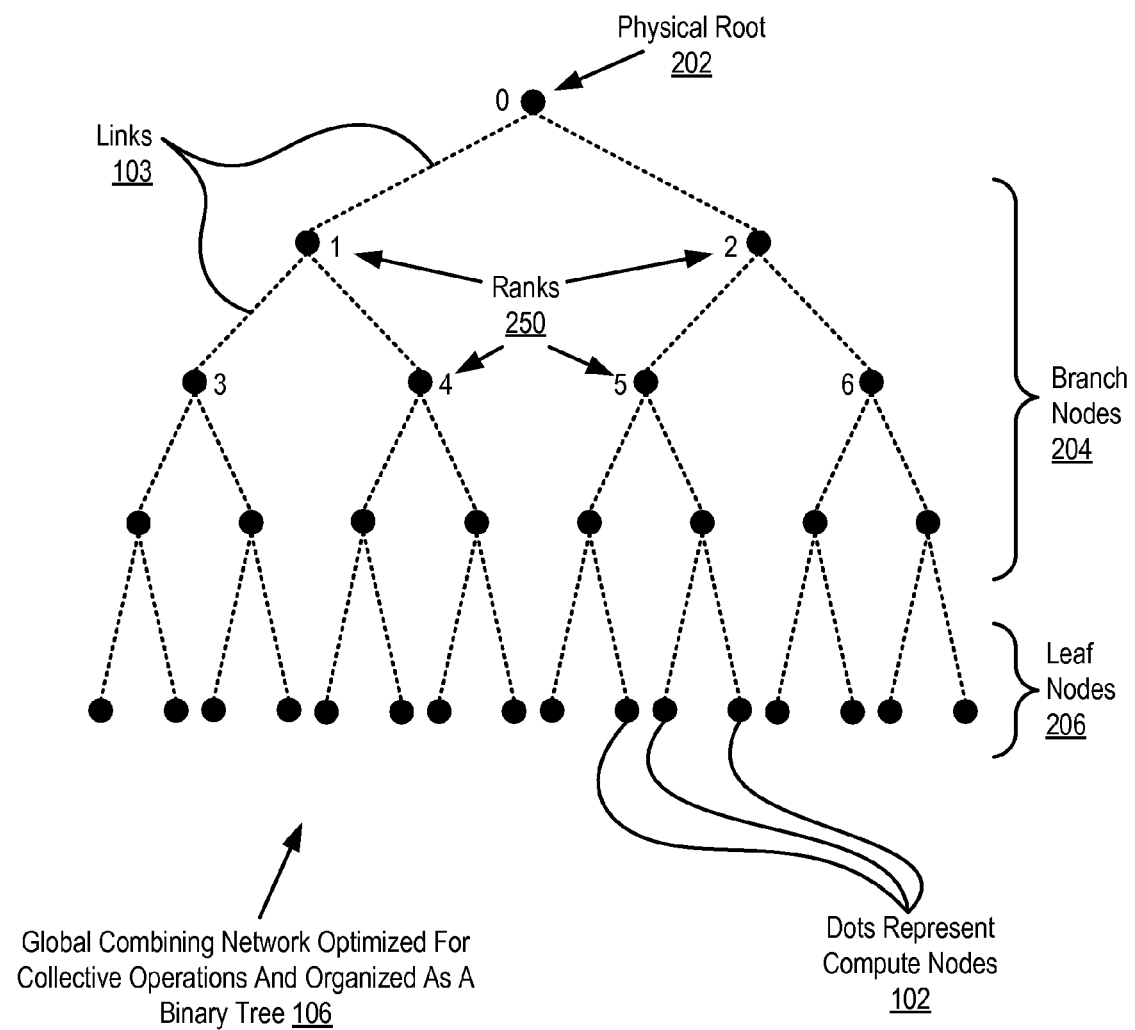
FIG. 5 sets forth a line drawing illustrating an exemplary data communications network optimized for collective operations useful in systems capable of load balanced data processing performed on an application message transmitted between compute nodes of a parallel computer in accordance with embodiments of the present invention.

For further explanation, FIG. 5 sets forth a line drawing illustrating an exemplary data communications network (106) optimized for collective operations useful in systems capable of load balanced data processing performed on an application message transmitted between compute nodes of a parallel computer in accordance with embodiments of the present invention. The example data communications network of FIG. 5 includes data communications links connected to the compute nodes so as to organize the compute nodes as a tree. In the example of FIG. 5, dots represent compute nodes (102) of a parallel computer, and the dotted lines (103) between the dots represent data communications links between compute nodes. The data communications links are implemented with global combining network adapters similar to the one illustrated for example in FIG. 3B, with each node typically providing data communications to and from two children nodes and data communications to and from a parent node, with some exceptions. Nodes in a binary tree (106) may be characterized as a physical root node (202), branch nodes (204), and leaf nodes (206). The root node (202) has two children but no parent. The leaf nodes (206) each has a parent, but leaf nodes have no children. The branch nodes (204) each has both a parent and two children. The links and compute nodes are thereby organized by this data communications network optimized for collective operations into a binary tree (106). For clarity of explanation, the data communications network of FIG. 5 is illustrated with only 31 compute nodes, but readers will recognize that a data communications network optimized for collective operations for use in systems for load balanced data processing performed on an application message transmitted between compute nodes of a parallel computer accordance with embodiments of the present invention may contain only a few compute nodes or may contain thousands of compute nodes.

In the example of FIG. 5, each node in the tree is assigned a unit identifier referred to as a 'rank' (250). A node's rank uniquely identifies the node's location in the tree network for use in both point to point and collective operations in the tree network. The ranks in this example are assigned as integers beginning with 0 assigned to the root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

Figure 6:
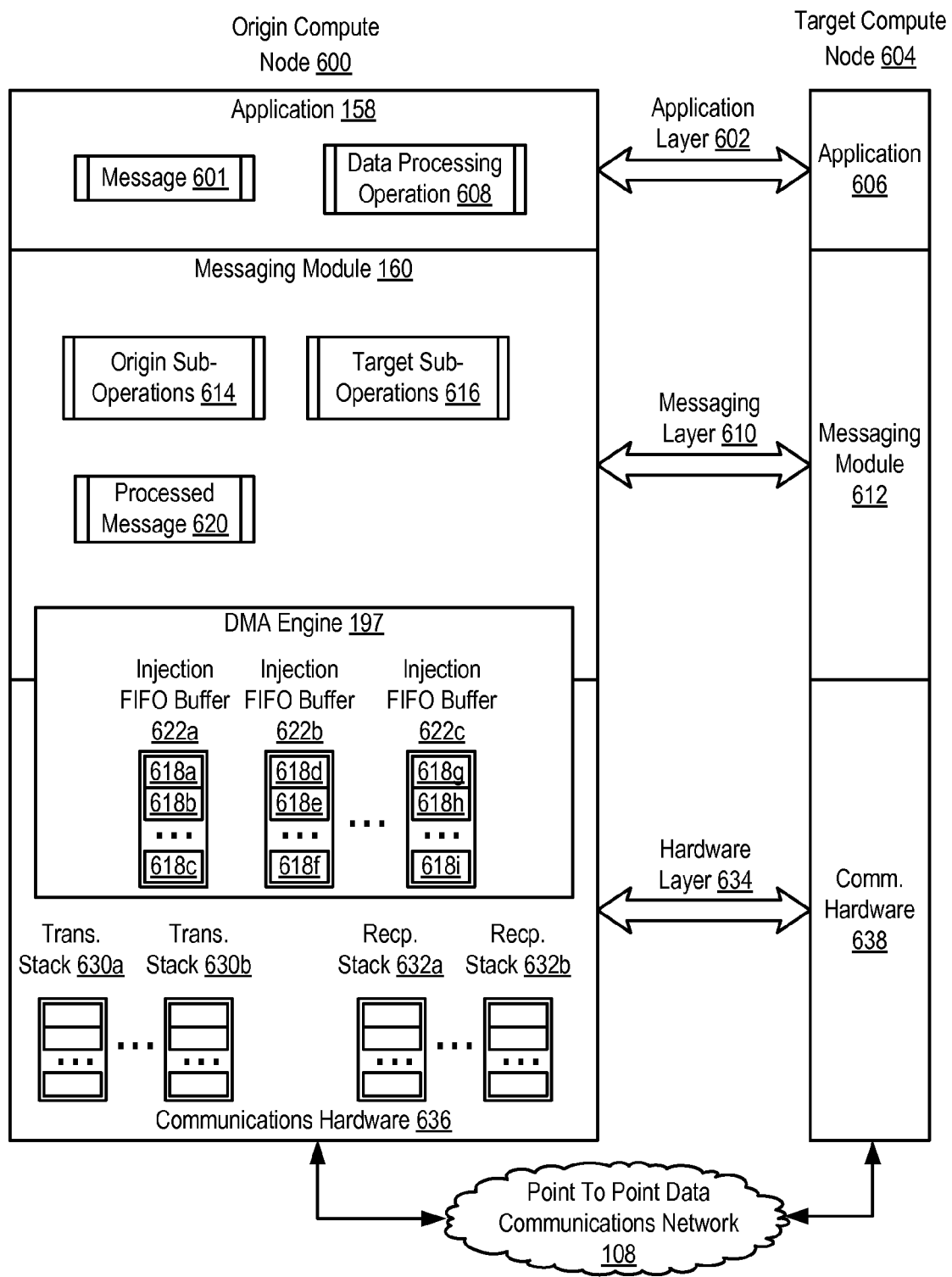
FIG. 6 sets forth a block diagram illustrating an exemplary communications architecture illustrated as a protocol stack useful in load balanced data processing performed on an application message transmitted between compute nodes of a parallel computer according to embodiments of the present invention.

For further explanation, FIG. 6 sets forth a block diagram illustrating an exemplary communications architecture illustrated as a protocol stack useful in load balanced data processing performed on an application message transmitted between compute nodes of a parallel computer according to embodiments of the present invention. The architecture of FIG. 6 implements a 'protocol stack' in the sense that a hardware layer of the architecture operates a hardware-level communications protocol among compute nodes, a messaging layer implements a messaging-level communication protocol, an application layer operates an application-level communications protocol, and the layers effect data communications among compute nodes using application programming interfaces ('API') calls among the layers in a 'stacked' fashion.

The exemplary communications architecture of FIG. 6 sets forth two compute nodes, an origin compute node (600) and a target compute node (604). Only two compute nodes are illustrated in the example of FIG. 6 for ease of explanation and not for limitation. In fact, load balanced data processing performed on an application message transmitted between compute nodes of a parallel computer according to embodiments of the present invention may be implemented using many compute nodes in very large scale computer systems such as parallel computers with thousands of nodes.

The exemplary communications architecture of FIG. 6 includes an application layer (602) composed of an application (158) installed on the origin compute node (600) and an application (606) installed on the target compute node (604). In the example of FIG. 6, the application (158) on the origin compute node (600) specifies a data processing operation (608) to be performed on an application message (601) across multiple compute nodes to effect load balancing according to embodiments of the present invention. For example, the application (158) of the origin node (600) may specify that an accumulate operation is to be performed on the data of the message (601) using the computing resources of both the origin node (600) and the target node (604).

The applications (158, 606) may effect load balanced data processing across multiple compute nodes and general communications using messaging modules (160, 612) installed on each of the compute nodes (600, 604). Applications (158) and (606) may communicate or perform such load balanced data processing by invoking function of an application programming interfaces ('API') exposed by the application messaging modules (160 and 612). To transmit message (601) to the application (606), the application (158) of FIG. 6 may invoke a function of an API for messaging module (160) that passes a buffer identifier of an application buffer containing the application message (601) to the messaging module (160). To perform load balanced data processing, the application (158) may pass this buffer identifier along with an identifier of the data processing operation (608) to be performed in a load balanced manner according to embodiments of the present invention.

The exemplary communications architecture of FIG. 6 includes a messaging layer (610) that implements data communications protocols for data communications that support messaging in the application layer (602). Such data communications protocols are typically invoked through a set of APIs that are exposed to the applications (158 and 606) in the application layer (602). In the example of FIG. 6, the messaging layer (610) is composed of messaging module (160) installed on the origin compute node (600) and messaging module (612) installed on the target compute node (604).

The messaging module (160) of FIG. 6 includes a set of computer program instructions for load balanced data processing performed on an application message transmitted between compute nodes of a parallel computer according to embodiments of the present invention. The messaging module (160) of FIG. 6 operates generally for load balanced data processing performed on an application message transmitted between compute nodes of a parallel computer according to embodiments of the present invention by: identifying the application message (601) for transmission to a target compute node, the message to be processed by a data processing operation (608); determining origin sub-operations (614) used to carry out a portion of the data processing operation (608) on the origin compute node (600); determining target sub-operations (616) used to carry out a remaining portion of the data processing operation (616) on the target compute node (604); processing the message (601) using the origin sub-operations (614); and transmitting the processed message (620) to the target compute node (604) for processing using the target sub-operations (616).

The exemplary communications architecture of FIG. 6 includes a hardware layer (634) that defines the physical implementation and the electrical implementation of aspects of the hardware on the compute nodes such as the bus, network cabling, connector types, physical data rates, data transmission encoding and may other factors for communications between the compute nodes (600 and 604) on the physical network medium. The hardware layer (634) of FIG. 6 is composed of communications hardware (636) of the origin compute node (600), communications hardware (638) of the target compute node (636), and the data communications network (108) connecting the origin compute node (600) to the target compute node (604). Such communications hardware may include, for example, point-to-point adapters and DMA controllers as described above with reference to FIGS. 2 and 3A. In the example of FIG. 6, the communications hardware (636) includes transmission stacks (630) for storing network packets for transmission to other communications hardware through the data communications network (108) and includes a reception stacks (632) for storing network packets received from other communications hardware through the data communications network (108).

The exemplary communications architecture of FIG. 6 illustrates a DMA engine (197) for the origin compute node (600). The DMA engine (197) in the example of FIG. 6 is illustrated in both the messaging module layer (610) and the hardware layer (634). The DMA engine (197) is shown in both the messaging layer (610) and the hardware layer (634) because a DMA engine useful in load balanced data processing performed on an application message transmitted between compute nodes of a parallel computer according to embodiments of the present invention may often provide messaging layer interfaces and also implement communications according to some aspects of the communication hardware layer (634). The exemplary DMA engine (197) of FIG. 6 includes injection FIFO buffers (622) for storing data descriptors (618) that specify DMA transfer operations for transferring data. Although not shown, the exemplary DMA engine (197) of FIG. 6 also includes a number of reception FIFO buffers used to receive messages from other DMA engines on other compute nodes.

Figure 7:
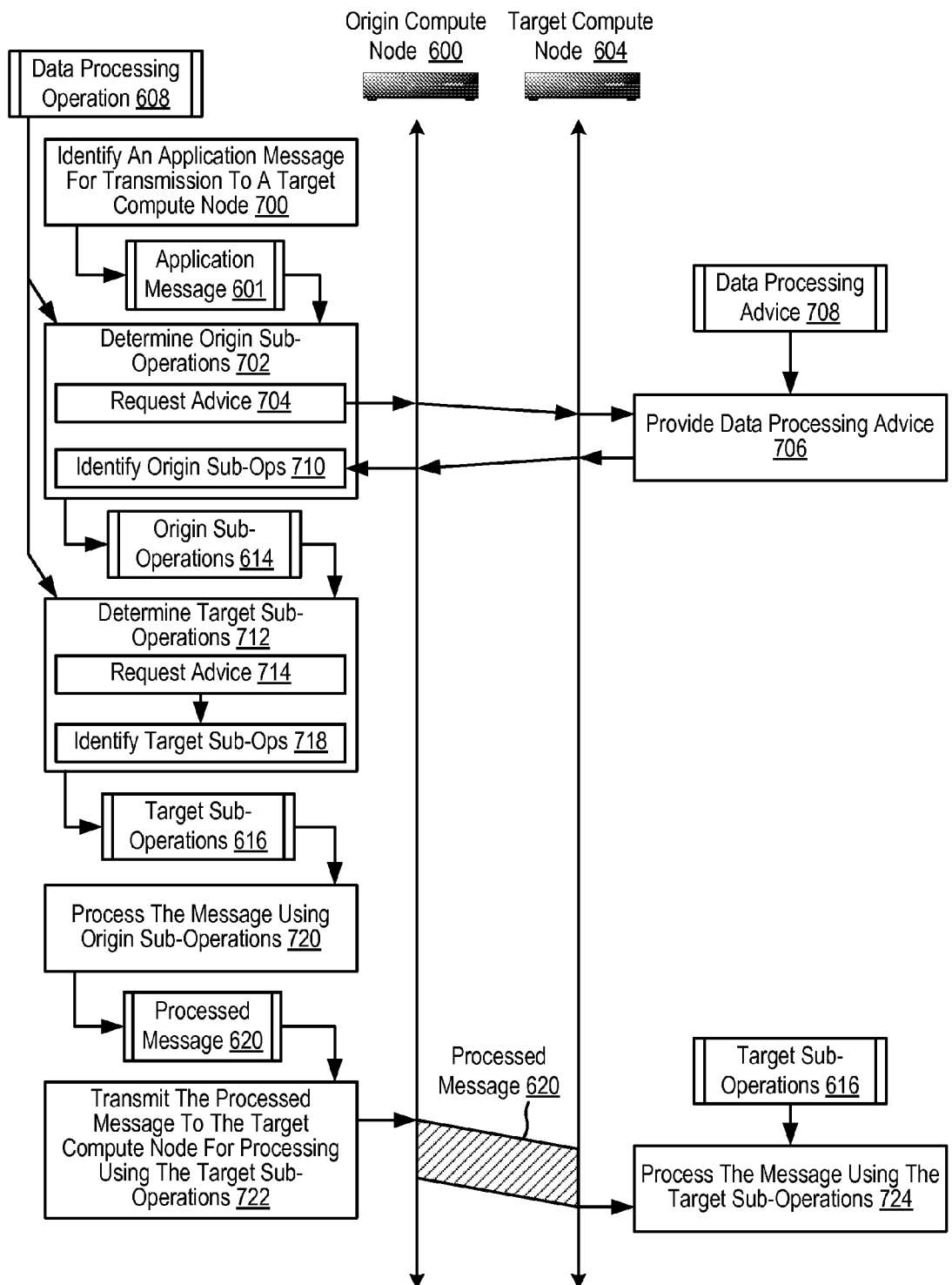
FIG. 7 sets forth a flow chart illustrating an exemplary method for load balanced data processing performed on an application message transmitted between compute nodes of a parallel computer according to the present invention.

For further explanation, FIG. 7 sets forth a flow chart illustrating an exemplary method for load balanced data processing performed on an application message transmitted between compute nodes of a parallel computer according to the present invention. The compute nodes described with reference to FIG. 7 are connected using plurality of data communications networks. At least one of the data communications networks is optimized for collective operations, while at least one of the data communications networks is optimized for point to point operations.

In the method of FIG. 7, load balanced data processing performed on an application message transmitted between compute nodes of a parallel computer may be carried out in a messaging module. However, readers will note that this example is for explanation only, and not limitation, and that load balanced data processing performed on an application message transmitted between compute nodes of a parallel computer may be carried out by other software or hardware components of the origin compute node as will occur to those of skill in the art.

The method of FIG. 7 includes identifying (700), by an origin compute node (600), an application message (601) for transmission to a target compute node (604). The application message (601) of FIG. 7 represents a data structure such as, for example, an array that stores application data. The messaging module of the origin compute node (600) may identify (700) the application message (601) according to the method of FIG. 7 by receiving an identifier for the application buffer in which the application message is stored. The messaging module may receive this buffer identifier as an argument for a function of the messaging module's API invoked by the application.

The message (601) of FIG. 7 is to be processed by a data processing operation (608). The data processing operation (608) of FIG. 7 represents an operation specified by an application that performs a particular data transformation task. The data processing operation (608) is typically one of many data processing operations specified by a parallel application. An example of a data processing operation may include an accumulate operation. In an accumulate operation, message data is scaled and added with other message data to yield an accumulation result. Because the message (601) of FIG. 7 may often be implemented as an array of data elements, processing the message (601) with the data processing operation (608) may refer to the process of apply the data processing operation (608) to each element of the message (601).

The method of FIG. 7 includes determining (702), by the origin compute node (600), origin sub-operations (614) used to carry out a portion of the data processing operation (608) on the origin compute node (600). As mentioned above, sub-operations are discrete primitive operations used to carry out the individual processing sub-tasks that make up a data processing operation. Consider the accumulate data processing operation for example. The accumulate operation may be broken down in a multiplication sub-operation and an addition sub-operation. In the example of FIG. 7, the origin sub-operations (614) are sub-operations performed on the origin compute node (600).

The origin compute node (600) determines (702) origin sub-operations (614) used to carry out a portion of the data processing operation (608) according to the method of FIG. 7 by requesting (704) data processing advice (708) from the target compute node (604) and identifying (710) the origin sub-operations (614) in dependence upon the data processing advice (708) from the target compute node (604). The data processing advice (708) of FIG. 7 specifies the processing availability capable of being provided by the target compute node (604). This processing availability may include, for example, the types of sub-operations available on the target compute node, an indication of the target node's current workload, and so on.

The origin compute node (600) may identify (710) the origin sub-operations (614) in dependence upon the data processing advice (708) according to the method of FIG. 7 by determining, from the data processing advice (708), which sub-operations that carry out the data processing operation (608) are available on the target compute node (604). The origin compute node (600) may the identify (710) the origin sub-operations (614) according to the method of FIG. 7 by comparing the target node's workload with the workload for the origin compute node (600) and selecting the number of sub-operations (614) to be performed on the origin node (600) based on the relative comparison of the target and origin nodes' workloads and the available sub-operations on the target node (604). The origin compute node (600) may also take into account the processing intensity of each of the sub-operations. For example, if a data processing operation is carry out first using five sub-operations that require little processing resources and then using one sub-operations that requires massive amounts of processing resources, the origin node (600) may assign the first five sub-operations to be performed on the origin node (600) and the last sub-operation to be performed on the target node (604), all other factors being equal, to load balance the data processing operation (608) across nodes (600, 604).

As mentioned above, the origin compute node (600) requests (704) data processing advice (708) from the target compute node (604). Accordingly, the method of FIG. 7 includes providing (706), by the target compute node (604), the data processing advice (708) to the origin compute node (600) in response to receiving the request. The target compute node (604) may provide (706) the data processing advice (708) to the origin compute node (600) according to the method of FIG. 7 by retrieving current workload information for the target node (604) or the types of sub-operations available on the target compute node (604), packetizing the information, and transmitting the packets through the network to the origin compute node. Readers will note that workload information may be represented in a variety of ways as will occur to those of skill in the art such as, for example, the percentage of time for a recent time period that the processing cores of the target node (604) are executing an idle system processing thread.

Readers will note that the origin compute node (600) of FIG. 7 may determine (702) origin sub-operations (614) used to carry out a portion of the data processing operation (608) in other ways besides requesting (704) data processing advice (708) from the target compute node (604) and identifying (710) the origin sub-operations (614) in dependence upon the data processing advice (708) from the target compute node (604). In some other embodiments, the origin compute node (600) may determine (702) origin sub-operations (614) by identifying the origin sub-operations (614) using a predefined data processing ruleset. A predefined data processing ruleset is a data structure defined by a system or application developer that specifies the manner in which the sub-operations of a particular data processing operation should be divided between the origin compute node (600) and the target compute node (604). Using a predefined data processing ruleset may be useful in certain embodiments because using a predefined data processing ruleset typically requires less computing and network resources to implement than using data processing advice (708) from the target node (604).

The method of FIG. 7 also includes determining (712), by the origin compute node (600), target sub-operations (616) used to carry out a remaining portion of the data processing operation (608) on the target compute node (604). The target sub-operations (616) of FIG. 7 are sub-operations performed on the target compute node (604). The origin compute node (712) determines (712) target sub-operations (616) in a manner similar to the way in which the origin compute node (600) determines (702) origin sub-operations (614). That is, the origin compute node (712) determines (712) target sub-operations (616) in the method of FIG. 7 by requesting (714) data processing advice (708) from the target compute node (604) and identifying (718) the target sub-operations (616) in dependence upon the data processing advice (708) from the target compute node (604). In some other embodiments, the origin compute node (600) may also determine (712) target sub-operations (616) by identifying the target sub-operations (616) using a predefined data processing ruleset.

The method of FIG. 7 also includes processing (720), by the origin compute node (600), the message (601) using the origin sub-operations (614). The origin compute node (600) may process (720) the message (601) according to the method of FIG. 7 by performing the origin sub-operations (614) on the data elements of the application message (601), yielding a processed message (620).

The method of FIG. 7 includes transmitting (722), by the origin compute node (600), the processed message (620) to the target compute node (604) for processing using the target sub-operations (616). The origin compute node (600) may transmit (722) the processed message (620) to the target compute node (604) for processing according to the method of FIG. 7 by embedding instructions to the target node (604) in the processed message's header to perform the target sub-operations on the processed message (620), packetizing the processed message (620), and transmitting the packets across the network to the target compute node (604).

The method of FIG. 7 then includes processing (724), by the target compute node (604), the message (620) processed with the origin sub-operations (614) using the target sub-operations (616). The target compute node (604) may process (724) the message (620) using the target sub-operations (616) according to the method of FIG. 7 by performing the target sub-operations (616) on the data elements of the processed message (620) and storing the result in an application message buffer on the target compute node (604).

The explanation above with respect to FIG. 7 describes an exemplary method in which the origin node applies the same sub-operations and the target node applies the same sub-operations to the data of the entire message. In some other embodiments, however, the origin node and the target node may each applies different sub-operations to different portions of the application message to balance the processing load. For further explanation, FIG. 8 sets forth a flow chart illustrating an exemplary method for load balanced data processing performed on an application message transmitted between compute nodes of a parallel computer according to the present invention.

Figure 8:
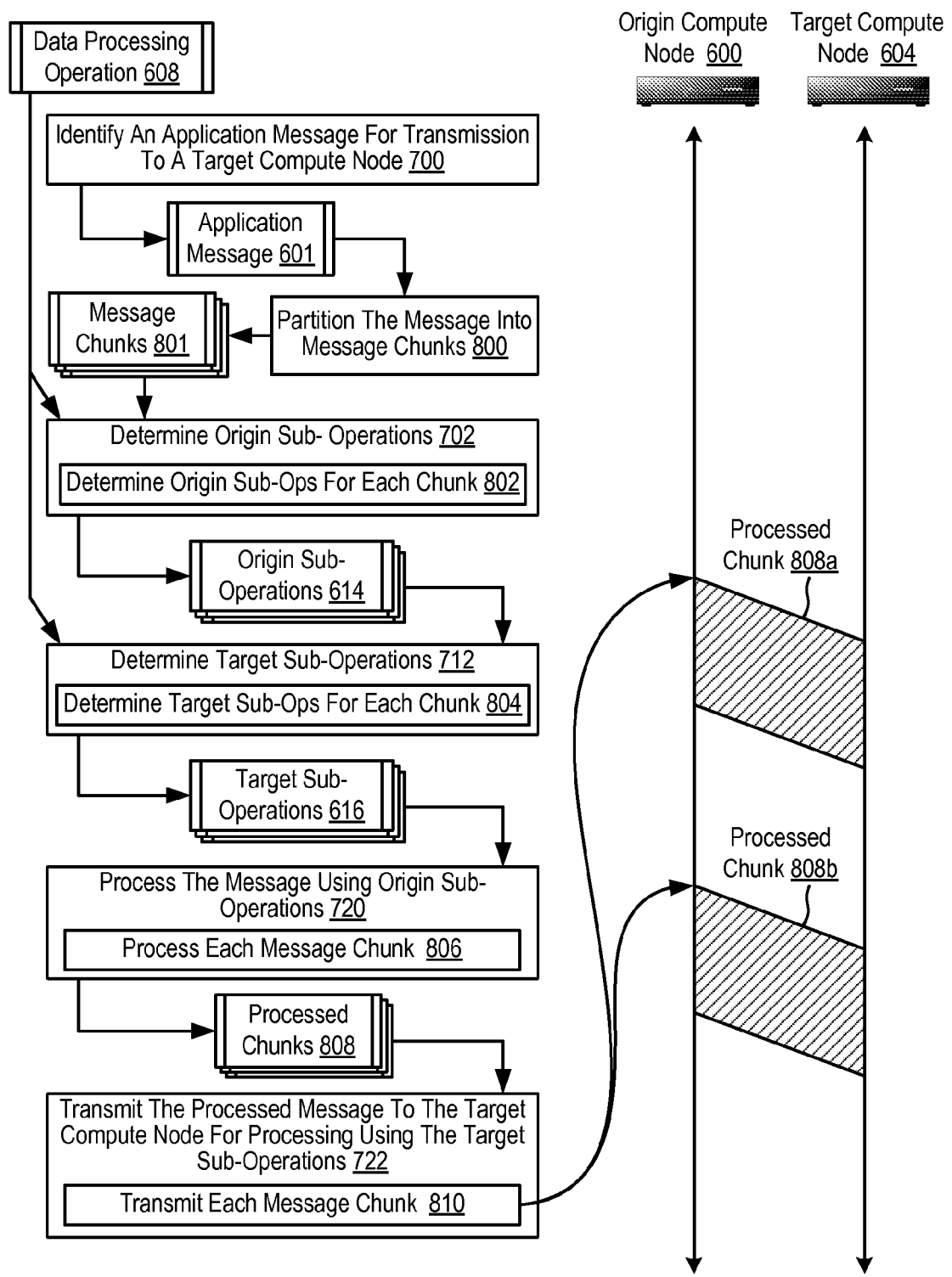
FIG. 8 sets forth a flow chart illustrating an exemplary method for load balanced data processing performed on an application message transmitted between compute nodes of a parallel computer according to the present invention.

The method of FIG. 8 is similar to the method of FIG. 7. That is, the method of FIG. 8 includes: identifying (700), by an origin compute node (600), an application message (601) for transmission to a target compute node (604); determining (702), by the origin compute node (600), origin sub-operations (614) used to carry out a portion of the data processing operation (608) on the origin compute node (600); determining (712), by the origin compute node (600), target sub-operations (616) used to carry out a remaining portion of the data processing operation (608) on the target compute node (604); processing (720), by the origin compute node (600), the message (601) using the origin sub-operations (614); and transmitting (722), by the origin compute node (600), the processed message (620) to the target compute node (604) for processing using the target sub-operations (616).

The method of FIG. 8 also includes partitioning (800), by the origin compute node (600), the message (601) into a plurality of message chunks (801). The origin compute node (600) may partition (800) the message (601) into a plurality of message chunks (801) according to the method of FIG. 8 by dividing the elements of the message (601) into message chunks (801) no larger than some predetermined chunk size. In some other embodiments, readers will note that the origin compute node (600) may also partition (800) the message (601) into a plurality of message chunks (801) according to the method of FIG. 8 by dividing the elements of the message (601) into message chunks (801) according to the sub-operations to be performed on each element by the origin node (600) and those sub-operations to be performed on each element by the target node (604). Elements on which the origin node (600) performs the same sub-operations may be group together in a message chunk.

In the example of FIG. 8, the origin compute node (600) determines (702) origin sub-operations (614) used to carry out a portion of the data processing operation (608) on the origin compute node (600) by determining (802), for each message chunk (801), the origin sub-operations (614) used to carry out a portion of the data processing operation (608) on that message chunk (801). The origin compute node may determine (802) the origin sub-operations (614) for each message chunk (801) according to the method of FIG. 8 by: selecting the particular origin sub-operations to be performed on the origin compute node (600); establishing a limit on the number of message chunks to be processed using the selected origin sub-operations based on the workloads of the origin node (600) and the target node (604) and the amount of processing required for each sub-operation of the data processing operation (608); determining whether the limit on the number of message chunks to be processed using the selected origin sub-operations is reached; assigning the selected origin sub-operations to the current message chunk if the limit is not reached; and if the limit is reached, assigning a different set of sub-operations to the current message chunk.

For example, consider a data processing operation in which the message data on the origin node is combined with some other data on the origin node and the result is converted to an endianess compatible with the target compute node (604), which has a different endianess than the origin compute node (600). Endianess refers to the byte or bit ordering that a particular hardware platform uses to represent data. Because endianess conversions are typically processor intensive, assigning all of the data combinations to the origin node and assigning all of the endianess conversions to the target node may create a processing load imbalance. For some of the message chunks, therefore, the origin node may perform the data combinations, and the target node may perform the endianess conversions. For the remaining message chunks, however, the origin node may perform the endianess conversions, and the target node may perform the data combinations.

In the method of FIG. 8, the origin compute node (600) determines (712) target sub-operations (616) used to carry out a remaining portion of the data processing operation (608) on the target compute node (604) by determining (804), for each message chunk (801), the target sub-operations (616) used to carry out a remaining portion of the data processing operation (608) on that message chunk (801). The origin compute node (600) may determine (804) the target sub-operations (616) for each message chunk (801) in a manner similar to the way in which the origin compute node (600) determines (802) the origin sub-operations (614) for each message chunk (801).

In the method of FIG. 8, the origin compute node (600) processes (720) the message (601) using the origin sub-operations (614) by processing (806) each message chunk (801) using the origin sub-operations (614) for that message chunk (801). The origin compute node (600) may process (806) each message chunk (801) using the origin sub-operations (614) for that message chunk (801) according to the method of FIG. 8 by performing the origin sub-operations (614) on the data elements of that message chunk (801), yielding a processed message chunk (808).

In the method of FIG. 8, the origin compute node (600) transmits (722) the processed message (620) to the target compute node (604) for processing using the target sub-operations (616) by transmitting (810) each processed message chunk (808) to the target compute node (604) for processing using the target sub-operations (616) for that message chunk (801). The origin compute node (600) may transmit (810) each processed message chunk (808) to the target compute node (604) for processing according to the method of FIG. 8 by embedding instructions to the target node (604) in the processed message chunk's header to perform the target sub-operations on the processed message chunk (808), packetizing the processed message chunk (808), and transmitting the packets across the network to the target compute node (604). The target compute node (604), in turn, processes each received message chunk (808) using the target sub-operations specified in the header of each message chunk (808).

Exemplary embodiments of the present invention are described largely in the context of a fully functional computer system for load balanced data processing performed on an application message transmitted between compute nodes of a parallel computer. Readers of skill in the art will recognize, however, that the present invention also may be embodied in a computer program product disposed on computer readable media for use with any suitable data processing system. Such computer readable media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of load balanced data processing performed on an application message transmitted between compute nodes of a parallel computer, the method comprising:
   identifying, by an origin compute node, an application message for transmission to a target compute node, the message to be processed by a data processing operation, wherein the application message is a data structure for storing application data;
   partitioning, by the origin compute node, the application message into a plurality of message chunks of a predetermined size;
   determining, by the origin compute node for each messaging chunk, origin sub-operations used to carry out a portion of the data processing operation on that messaging chunk on the origin compute node;
   determining, by the origin compute node for each messaging chunk, target sub-operations used to carry out a remaining portion of the data processing operation on that messaging chunk on the target compute node;
   processing each message chunk, by the origin compute node, the message using the origin sub-operations for that message chunk; and
   transmitting, by the origin compute node, each processed message chunk to the target compute node for processing using the target sub-operations for that message chunk.

2. The method of claim 1 wherein determining, by the origin compute node, origin sub-operations used to carry out a portion of the data processing operation further comprises identifying the origin sub-operations using a predefined data processing ruleset.

3. The method of claim 1 wherein determining, by the origin compute node, target sub-operations used to carry out a remaining portion of the data processing operation further comprises identifying the target sub-operations using a predefined data processing ruleset.

4. The method of claim 1 wherein determining, by the origin compute node, origin sub-operations used to carry out a portion of the data processing operation further comprises:
   requesting data processing advice from the target compute node; and
   identifying the origin sub-operations in dependence upon the data processing advice from the target compute node.

5. The method of claim 1 wherein determining, by the origin compute node, target sub-operations used to carry out a remaining portion of the data processing operation further comprises:
   requesting data processing advice from the target compute node; and
   identifying the target sub-operations in dependence upon the data processing advice from the target compute node.

6. The method of claim 1 wherein the parallel computer further comprises a plurality of compute nodes, the plurality of compute nodes connected together using a plurality of data communications networks, at least one of the data communications networks optimized for collective operations, and at least one of the data communications networks optimized for point to point operations.

7. An origin compute node capable of load balanced data processing performed on an application message transmitted between compute nodes of a parallel computer, the origin compute node comprising one or more computer processors and computer memory operatively coupled to the computer processors, the computer memory having disposed within it computer program instructions capable of:
   identifying, by an origin compute node, an application message for transmission to a target compute node, the message to be processed by a data processing operation, wherein the application message is a data structure for storing application data;
   partitioning, by the origin compute node, the application message into a plurality of message chunks of a predetermined size;
   determining, by the origin compute node for each messaging chunk, origin sub-operations used to carry out a portion of the data processing operation on that messaging chunk on the origin compute node;
   determining, by the origin compute node for each messaging chunk, target sub-operations used to carry out a remaining portion of the data processing operation on that messaging chunk on the target compute node;
   processing each message chunk, by the origin compute node, the message using the origin sub-operations for that message chunk; and
   transmitting, by the origin compute node, each processed message chunk to the target compute node for processing using the target sub-operations for that message chunk.

8. The origin compute node of claim 7 wherein determining origin sub-operations used to carry out a portion of the data processing operation further comprises identifying the origin sub-operations using a predefined data processing ruleset.

9. The origin compute node of claim 7 wherein determining target sub-operations used to carry out a remaining portion of the data processing operation further comprises identifying the target sub-operations using a predefined data processing ruleset.

10. A computer program product for load balanced data processing performed on an application message transmitted between compute nodes of a parallel computer, the computer program product disposed upon a non-transitory computer readable medium, the computer program product comprising computer program instructions capable of:
   identifying, by an origin compute node, an application message for transmission to a target compute node, the message to be processed by a data processing operation, wherein the application message is a data structure for storing application data;

partitioning, by the origin compute node, the application message into a plurality of message chunks of a predetermined size;

determining, by the origin compute node for each messaging chunk, origin sub-operations used to carry out a portion of the data processing operation on that messaging chunk on the origin compute node;

determining, by the origin compute node for each messaging chunk, target sub-operations used to carry out a remaining portion of the data processing operation on that messaging chunk on the target compute node;

processing each message chunk, by the origin compute node, the message using the origin sub-operations for that message chunk; and transmitting, by the origin compute node, each processed message chunk to the target compute node for processing using the target sub-operations for that message chunk.

11. The computer program product of claim 9 wherein determining, by the origin compute node, origin sub-operations used to carry out a portion of the data processing operation further comprises identifying the origin sub-operations using a predefined data processing ruleset.

12. The computer program product of claim 10 wherein determining, by the origin compute node, target sub-operations used to carry out a remaining portion of the data processing operation further comprises identifying the target sub-operations using a predefined data processing ruleset.

13. The computer program product of claim 10 wherein determining, by the origin compute node, origin sub-operations used to carry out a portion of the data processing operation further comprises:

requesting data processing advice from the target compute node; and identifying the origin sub-operations in dependence upon the data processing advice from the target compute node.

14. The computer program product of claim 10 wherein determining, by the origin compute node, target sub-operations used to carry out a remaining portion of the data processing operation further comprises:

requesting data processing advice from the target compute node; and identifying the target sub-operations in dependence upon the data processing advice from the target compute node.

15. The computer program product of claim 10 wherein the parallel computer further comprises a plurality of compute nodes, the plurality of compute nodes connected together using a plurality of data communications networks, at least one of the data communications networks optimized for collective operations, and at least one of the data communications networks optimized for point to point operations.

* * * * *